United States Patent [19]

Miles et al.

[11] 3,865,486

[45] Feb. 11, 1975

[54] AREA MEASURING DEVICE

[75] Inventors: William B. Miles, Barrington, Ill.; John S. Copeland, Embourg, Belgium

[73] Assignee: Addressograph Multigraph Corp., Cleveland, Ohio

[22] Filed: June 4, 1973

[21] Appl. No.: 366,961

[52] U.S. Cl. .................... 355/64, 33/123, 355/41
[51] Int. Cl. ......................................... G03b 27/32
[58] Field of Search ............ 33/123; 355/40, 41, 42, 355/50, 51, 64, 65, 53

[56] References Cited

UNITED STATES PATENTS

| | | | |
|---|---|---|---|
| 2,617,197 | 11/1952 | Derby | 33/123 |
| 2,748,487 | 6/1956 | Zimmermann | 33/123 |
| 3,264,739 | 8/1966 | Berlinsky et al. | 33/123 |
| 3,563,649 | 2/1971 | Biscow et al. | 355/50 |
| 3,571,932 | 3/1971 | Peddie | 33/123 |
| 3,575,588 | 4/1971 | Hermann | 355/53 |

*Primary Examiner*—Samuel S. Matthews
*Assistant Examiner*—E. M. O'Connor
*Attorney, Agent, or Firm*—Mason, Kolehmainen, Rathburn & Wyss

[57] ABSTRACT

An area measuring device automatically measures the area of a planar object in motion along a path of travel. The device is particularly useful in conjunction with a copying machine for measuring the area of an original document being fed through the copying machine for reproduction purposes. The width of the original document is measured by a plurality of spaced sensors disposed transverse to the path of travel of the original document. The length of the original document is measured by a pulse generator which generates a plurality of clock pulses indicative of the length of the original document being fed through the copying machine. The area of the original document is determined by loading the width of the original document is determined by loading the width of the original document as detected by the plurality of spaced sensors into a parallel-load shift register and by shifting the width information out of the shift register in response to the clock pulses from the pulse generator indicative of the length of the original document. Each output pulse from the shift register thus represents an area increment of the original document. The output pulses from the shift register are fed to an indicator counter which accumulates these output pulses and provides a visual numerical indication of the total area of the original document fed through the copying machine.

27 Claims, 6 Drawing Figures

Fig. 1.

AREA MEASURING DEVICE

BACKGROUND OF THE INVENTION

1. Field of the Invention

The invention relates generally to devices for determining the area of planar objects and, more particularly, to an improved device for measuring the area of an original document being fed through a copying machine for reproduction purposes.

2. Description of the Prior Art

Many copying machines are now capable of accepting very large original documents for reproduction purposes. In connection with such copying machines, it has been a problem to provide a simple device for automatically measuring and indicating the area of a particular original document being fed through the copying machine for reproduction purposes. Such a device is desirable in order to obtain billing information for the reproduction services.

SUMMARY OF THE INVENTION

An object of the present invention is to provide a new and improved device for automatically determining the area of a planar object.

Another object of the present invention is to provide a new and improved device for automatically determining the area of a planar object in motion along a path of travel.

Another object of the present invention is to provide a new and improved device for automatically determining the area of an original document being fed through a copying machine for reproduction purposes.

Another object of the present invention is to provide a new and improved device for automatically determining the area of an original document being fed through a copying machine for reproduction purposes and for providing a visual indication representative of the area of the original document.

Another object of the present invention is to provide a new and improved device for automatically determining the area of an original document being fed through a copying machine for reproduction purposes including sensing means suitably disposed for measuring the width of the original document and including a pulse generator for generating a plurality of pulses representative of the length of the document.

Another object of the present invention is to provide a new and improved device for automatically determining the area of an original document being fed through a copying machine for reproduction purposes including means for accumulating and totalizing a plurality of signals representative of area increments of the original document.

Briefly, the device of the present invention automatically measures the area of the planar object in motion along a path of travel. The device is particularly useful in conjunction with a copying machine for measuring the area of an original document being fed through the copying machine for reproduction purposes. The device of the present invention includes a plurality of spaced sensors disposed transverse to the path of travel of the original document through the copying machine for measuring the width of the original document and for transferring this information to a parallel-load shift register. The length of the original document is measured by means of a pulse generator which generates a plurality of clock pulses indicative of the length of the original document. In a preferred embodiment, the pulse generator includes a rotatable, apertured, opaque, circular disk in combination with an electromagnetic radiation source and an electromagnetic radiation detector. A predetermined number of clock pulses are generated by the disk rotating past the electromagnetic radiation source and detector. The clock pulses are used to shift the width information out of the parallel-load shift register. Each output pulse from the shift register represents an area increment of an original document. The device of the present invention further includes means for accumulating and totalizing the output pulses from the shift register and for providing a visual numerical indication of the total area of the original document fed through the copying machine.

BRIEF DESCRIPTION OF THE DRAWINGS

The above and other objects, advantages and novel features of the present invention will be apparent from the following detailed description of a preferred embodiment of the invention illustrated in the encompanying drawings wherein.

DESCRIPTION OF THE PREFERRED EMBODIMENTS

Figure 1:
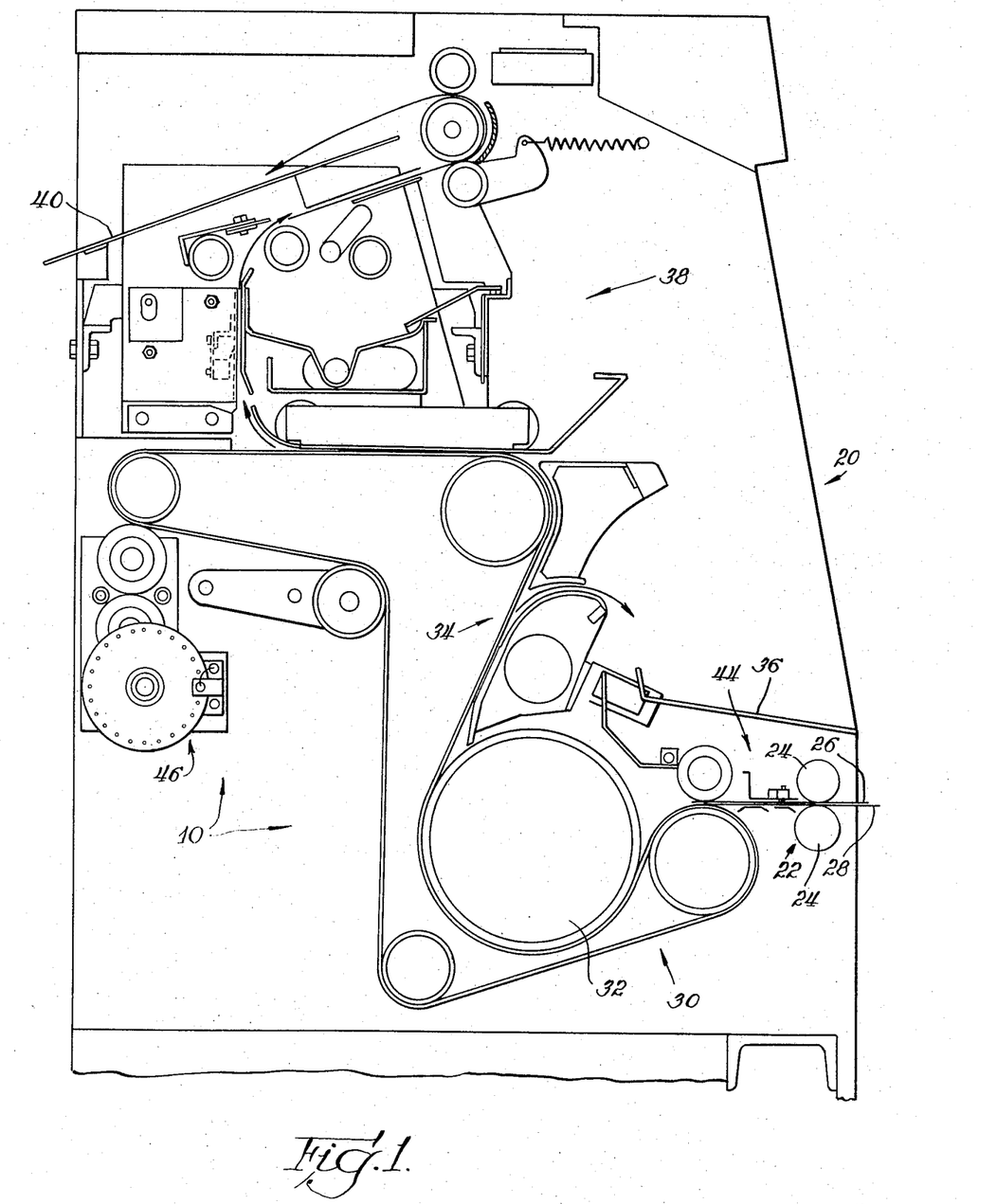
FIG. 1 illustrates a diagrammatic view of an embodiment of a copying machine utilizing the device of the present invention.

Referring to the drawings and initially to FIG. 1, there is illustrated a new and improved device for automatically determining the area of a planar object and generally indicated as 10. As illustrated in FIG. 1, the device 10 is especially adapted to operate in conjunction with a copying machine that accepts original documents for reproduction purposes. The device 10 is utilized to measure and preferably provide a visual indication of the total area of an original document fed through the copying machine for reproduction purposes.

In accordance with an important advantage of the present invention, the device 10 operates in conjunction with a copying machine 20 having a feed station 22 formed by a pair of feed rollers 24. In a particular embodiment, the feed rollers 24 feed an original document 26 and a sheet of copy paper 28 to a transport assembly 30.

The transport assembly 30 feeds the original document 26 and the sheet of copy paper 28 past an exposure station 32 where a latent image of the original document 26 is formed on the sheet 28. From the exposure station 32, the transport assembly 30 transfers the original document 26 and the sheet 28 to a separating station 34 which separates the original document 26 from the sheet 28 and expels the original document 26 from the copying machine 20 into a receiving tray 36. From the separating station 34, the sheet 28 is fed to a developing station 38 at which the latent image on the sheet 28 is developed and fixed to form a permanent visible copy of the original document 26. From the developing station 38, the copy paper 28 is expelled from the copying machine 20 along an exit path 40.

In accordance with an important feature of the present invention, the device 10 includes a sensing device 44 disposed in the path of travel of the original document 26 for determining the width of the original document 26 being fed through the copying machine 20. As illustrated in FIG. 1, the sensing device 44 is positioned between the feed station 22 and the transport assembly 30.

Obviously, the sensing device 44 when positioned between the feed station 22 and the transport assembly 30 senses the width of the original document 26 or the width of the sheet 28, whichever is greater in width. If it is desired to merely sense the width of the original document 26 being fed through the copying machine 20, the sensing device 44 could be suitably positioned between the separating station 34 and the receiving tray 36 of the copying machine 20 to accomplish this objective.

The device 10 further includes a pulse generator 46 for generating a series of data pulses indicative of the length of an original document 26 being fed through the copying machine 20. With the sensing device 44 in the position illustrated in FIG. 1, the length measured by the device 10 is the length of the original document 26 or of the sheet of copy paper 28, whichever is greater in length. If the sensing device 44 is alternately positioned between the separating station 34 and the receiving tray 36, as described above, the length measured by the device 10 is that of the original document 26.

Figure 2:
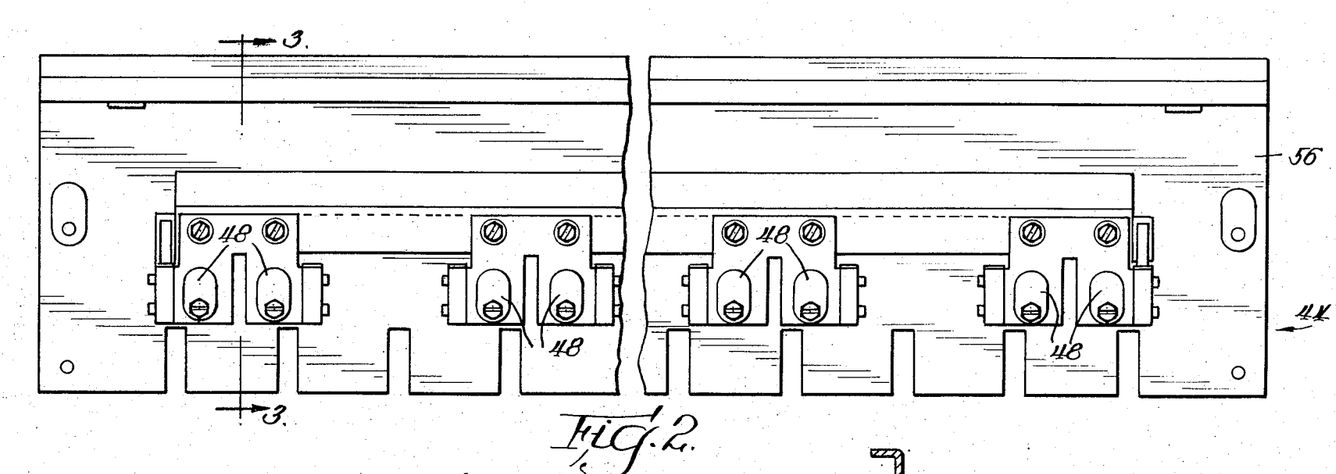
FIG. 2 illustrates a detailed, fragmentary top view of a preferred embodiment of a portion of the device of the present invention.
Figures 3, 5:
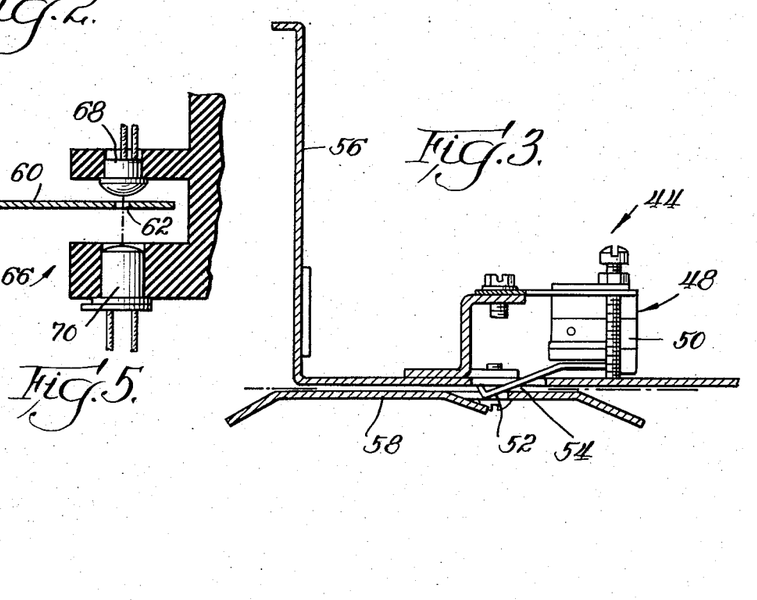
FIG. 3 illustrates a sectional view of the portion of the device illustrated in FIG. 2 taken along line 3—3 of FIG. 2.
FIG. 5 illustrates a fragmentary, sectional view of the portion of the device of the present invention illustrated in FIG. 4 taken along line 5—5 of FIG. 4.

In accordance with an important feature of the present invention, the sensing device 44 includes a plurality of spaced sensors 48 (FIGS. 2 and 3) equally spaced across the width of the path of travel of the original document 26 through the copying machine 20. In a preferred embodiment, each of the sensors 48 includes a miniature mechanical switch 50 having a deflectable member 52 disposed in a portion 54 of the path of travel of the original document 26. In transversing the portion 54, the original document 26 deflects the member 52 to cause the switch 50 to change from its first to its second of two states, thereby indicating the presence of an original document 26. The sensing device 44 further includes a frame member 56 for maintaining the sensors 48 in a spaced apart relationship in a position transverse to the path of travel of the original document 26 through the copying machine 20. A lower rigid member 58 combines with the frame member 56 to form the portion 54 of the path of travel of the original document 26 past the deflectable member 52 of the switch 50.

Figure 4:
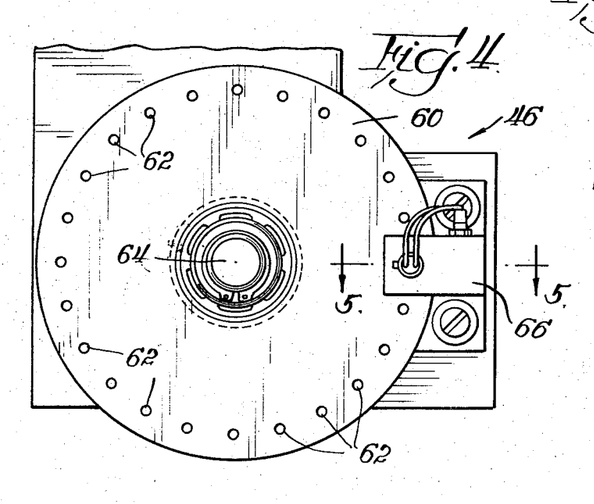
FIG. 4 illustrates a detailed, fragmentary view of a preferred embodiment of another portion of the device of the present invention.

In accordance with another important feature of the present invention, the pulse generator 46 includes a circular, opaque disk 60 (FIG. 4) having a plurality of apertures 62 evenly spaced around its periphery. As more fully explained hereinafter, the plurality of apertures 62 in a preferred embodiment equals an integral multiple of the number of spaced sensors 48 of the sensing device 44. The disk 60 is mounted on a drive shaft 64 for rotating the apertures 62 past a detector 66. Preferably, the drive shaft 64 is driven by the motor used to drive the feed rollers 24 so that a predetermined fixed number of the apertures 62 are driven past the detector 66 for a predetermined interval of travel of an original document 26 through the copying machine 20. In a preferred embodiment, the disk 60 is continuously driven by the drive shaft 64 during the entire time that the copying machine 20 is energized. Alternatively, the disk 60 and the drive shaft 64 may be held stationary until the original document 26 is detected by a suitable sensing means disposed in the path of travel of the original document 26 through the copying machine 20.

In a preferred embodiment, the detector 66 is formed by a source of electromagnetic radiation 68 (FIG. 5) and an electromagnetic radiation detecting device 70. The source 68 may be formed by a light emitting diode and the detecting device 70 may be formed by a phototransistor that is driven into saturation when an amount of light greater than the threshold level of the phototransistor impinges on the base of the phototransistor. Thus, the phototransistor forming the detecting device 70 is driven into saturation and rendered conductive by the passage of an aperture 62 between the source 68 and the device 70. The phototransistor forming the detecting device 70 is maintained nonconductive when the opaque portions of the disk 60 positioned between adjacent apertures 62 pass directly between the source 68 and the detecting device 70.

In accordance with a further important feature of the present invention, a logic control circuit 100 (FIG. 6) is provided for controlling the operation of the device 10. The control circuit 100 correlates the information corresponding to the width of the original document 26 being fed through the copying machine 20 as detected by the sensing device 44 with the information corresponding to the length of the original document 26 as indicated by the pulse generator 46 and the detector 66. This combined information is utilized to provide an output representative of the area of the original document 26 fed through the copying machine 20 for reproduction purposes.

Figure 6:
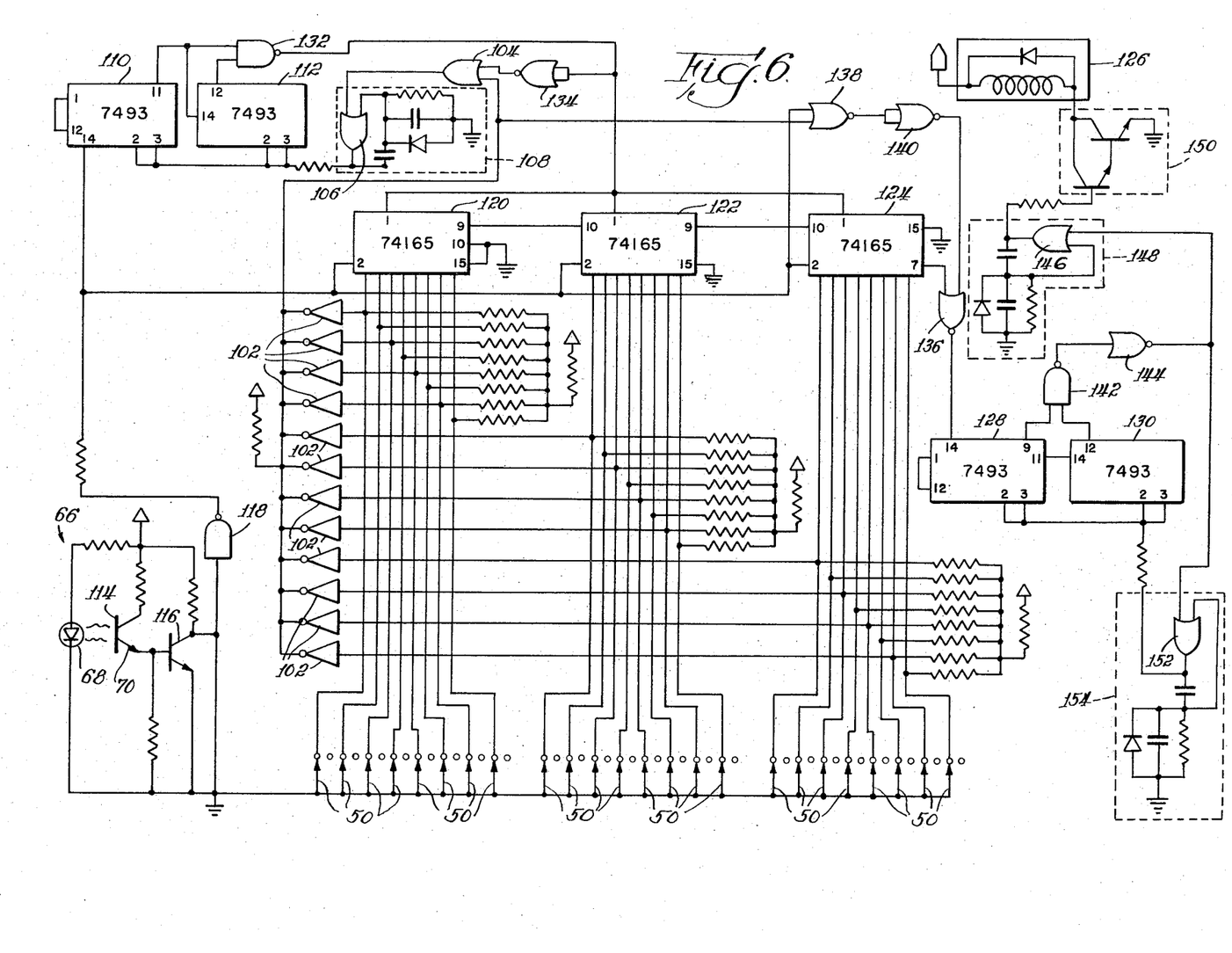
FIG. 6 illustrates a preferred embodiment of a logic control circuit for controlling the device of the present invention.

In accordance with the preferred practice of electronic circuit designers, the details of the control circuit 100 for the device 10 are set forth in a logic diagram (FIG. 6) rather than in an actual circuit diagram. In physically constructing an actual operative embodiment of the control circuit 100, each logic element illustrated in FIG. 6 is replaced by an equivalent electrical circuit that performs the logical task defined by the logic element. The use of logic elements emphasizes that any of the many different electrical circuits capable of performing a given logical task may be used interchangeably in the present invention.

The preferred embodiment of the control circuit 100 utilizes three different types of logic gates: an OR gate, a NOR gate and a NAND gate. When the output from an OR gate, a NOR gate or a NAND gate is at a high or more positive voltage level, that gate is referred to hereinafter as being enabled. When the output of an OR gate, a NOR gate or a NAND gate is at a low voltage level or at ground potential, the gate is referred to hereinafter as being inhibited.

An OR gate is enabled when one or more of its input leads is at a high or more positive voltage level. When all of its input leads are at a low voltage level or ground potential, the OR gate is inhibited. An example of an OR gate is gate 104.

A NOR gate is enabled only when all of its input leads are at a low voltage level or ground potential. When one or more of the input leads to a NOR gate is at a high or more positive voltage level, the NOR gate is inhibited. An example of a NOR gate is gate 134.

A NAND gate is enabled at all times except when all of the inputs to the NAND gate are at a high or more positive voltage level, at which time the NAND gate is inhibited. An example of a NAND gate is gate 118.

FIG. 6 further illustrates the use of an OR gate as a ONE-SHOT device for providing an output pulse having a predetermined pulse-width. Such a ONE-SHOT device includes an OR gate with its output coupled across a series capacitor to one of its input leads and a parallel RC circuit connected between the input lead and ground potential. When a high or more positive voltage level, greater than the threshold voltage level of the OR gate appears at the output of the OR gate, it is instantaneously coupled across the series capacitor back to the input of the OR gate to thereby rapidly increase the rise time of the leading edge of the output pulse from the enabled OR gate.

This positive feedback voltage, which is returned to the input of the OR gate from its output, holds the OR gate in its enabled state until the series capacitor approaches a substantially fully charged state. At this time, the feedback voltage to the input of the OR gate drops below the threshold level of the OR gate; and the OR gate is inhibited. When this occurs, a diode connected in parallel with the parallel RC circuit and having its anode connected to ground potential becomes forwardly biased and rapidly discharges the series capacitor connected between the output and the input of the OR gate. Since the pulse-width of the output pulse from the OR gate depends upon the time constant of the positive feedback circuit and since the time constant of the positive feedback circuit depends primarily upon the product of the series capacitor and the resistor of the parallel RC circuit, the pulse-width may be easily set in advance to the value required. An example of such a ONE-SHOT device is the ONE-SHOT 108.

The control circuit 100 also utilizes two different, well-known, commercially available TTL integrated circuits. These circuits are available from several commercial suppliers, for example, from the Texas Instruments Company as part of its Series 74 TTL integrated circuit line. The first type of integrated circuit utilized is a 4-BIT binary counter available from the Texas Instruments Company under its designation 7,493. The second integrated circuit utilized is a parallel-load 8-BIT shift register available from the Texas Instruments Company under its designation 7,4165. These integrated circuits are well-known and their functioning and interconnection in the control circuit 100 of the present invention will be readily apparent to those of ordinary skill in the art in light of the following discussion. Obviously, equivalent circuits may be substituted for those specifically identified herein without significantly affecting the operation of the control circuit 100 of the present invention.

The operation of the device 10 under the control of the control circuit 100 is initiated by the detection of an original document 26 by the sensing device 44. An original document 26 being transported along the portion 54 of its path of travel (FIG. 3) deflects one or more of the deflectable members 52 of one or more of the switches 50. The switches 50 are illustrated in FIG. 6 as a plurality of normally closed switches 50. When the deflectable members 52 are in their normal undeflected position, that is, in the absence of an original document 26, a ground or reference potential is applied through the normally closed contacts of the switches 50 to each of the inputs of a plurality of inverting amplifiers 102. The outputs of the amplifiers are thus maintained at a high positive voltage level to thereby enable an OR gate 104. Enabling the OR gate 104 maintains an OR gate 106 of a ONE-SHOT 108 enabled. The enabled OR gate 106 maintains a pair of serially-connected binary counters 110 and 112 in their inactive or noncounting states.

The presence of an aperture 62 of the disk 60 in the path between the source 68 and the detecting device 70 drives a phototransistor 114 into its conductive state to drive a transistor 116 into its conductive state. In its conductive state, the transistor 116 supplies a ground or reference potential to the input of a NAND gate 118 to enable the gate 118 and to thereby provide a positive clock pulse to the input of the binary counter 110 and to a plurality of serially connected shift registers 120, 122 and 124.

Since the binary counters 110 and 112 are maintained in their inactive or noncounting states by the enabled OR gate 106, the positive clock pulse from the gate 118 is prevented from advancing the binary counters 110 and 112 until at least one of the normally-closed contacts of the ssitches 50 is moved to an open position in response to the detection of an original document 26 in the portion 54 of the path of travel of the original document 26.

If all of the contacts of the switches 50 are in their normally closed position, no width information is loaded into any of the stages of the shift registers 120, 122 and 124. Thus, no output pulses are derived from the shift registers 120, 122 and 124 in response to the clock pulses from the gate 118.

In order to provide a full and complete description of the operation of the control circuit 100, a specific embodiment of the device 10 is set forth hereinafter. In a specific embodiment of the device 10, 24 miniature mechanical switches 50 are disposed across a 42 inch wide document feed path of the copying machine 20. Thus, the copying machine 20 reproduces and the device 10 automatically measures the area of original documents 26 of from greater than zero to 42 inches in width. The 24 miniature mechanical switches 50 are equally spaced 1.72 inches across the width of the path of travel of the original document 26 through the copying machine 20.

Preferably, the number of apertures 62 disposed about the periphery of the disk 60 equals an integral multiple of the number of the switches 50. In this specific embodiment of the device 10, 24 apertures 62 are disposed about the periphery of the disk 60. Also, in this specific embodiment, the drive shaft 64 of the disk 60 is driven by the motor that drives the feed rollers 24 to cause one revolution of the disk 60 for each 2.32 inches of linear travel of the original document 26 through the copying machine 20. Thus, 24 clock pulses are provided to the input of the binary counter 110 and the shift registers 120, 122 and 124 for each 2.32 inch increment of linear travel of the original document 26 through the copying machine 20.

Each output pulse from the shift register 124 thus represents a 4 square inch increment of area of the original document 26. The output pulses from the shift register 124 advance an indicator counter 126, conventional per se, that is used to totalize and provide a visual indication or readout of the increments of area of the original document 26 passing through the copying machine 20 as indicated by the output pulses from the shift register 124. The visual indication or readout of the indicator counter 126 may be in any convenient area increment, such as one, one-half or one-tenth square foot increments. The indicator counter 126 is illustrated as being electromechanical in nature, but could obviously be replaced by any desired type of an electrical information storage device.

As illustrated in the specific embodiment of FIG. 6, the output pulses from the shift register 124 are directed to a pair of serially-connected 4-BIT binary counters 128 and 130. The binary counters 128 and 130 are used to provide a pulse for advancing the indicator counter 126 one step for every set of 18 output pulses from the shift register 124. The indicator counter 126 is thus advanced one step for each one-half square foot increment of area of the original document 26 passing through the copying machine 20.

In order to provide a complete description of the operation of a specific embodiment of the device 10, it is assumed that an operator desires to make a copy of an original document 26 measuring 14 inches in width by 20 inches in length. The operator provides a sheet 28 of copy paper, presumably of the same dimensions as the original document 26, and feeds the original document 26 and the sheet 28 into the copying machine 20.

The original document 26 and the sheet 28 are detected by the sensing device 44 when the deflectable member 52 of one or more of the mechanical switches 50 is moved out of the portion 54. This movement causes the corresponding normally-closed contact of the affected mechanical switch 50 to be moved to its open position.

If the original document 26 and the sheet 28 are fed into the copying machine 20 in a non-skewed condition, eight contacts of eight adjacent switches 50 are moved from their normally-closed position to an open position. A high voltage level is thus provided to the inputs of eight of the plurality of inverting amplifiers 102 to drive their outputs to low voltage level. This, in turn, inhibits the OR gates 104 and 106 to enable the counter 110 to begin counting clock pulses received from the gate 118.

The counter 110 provides an output pulse to the serially-connected counter 112 after receiving and counting 16 input clock pulses. After receiving the sixteenth clock pulse, the counter 110 provides an output pulse to the input of the counter 112 and resets itself to continue the counting of the clock pulses from the gate 118.

Upon receipt of the 24th clock pulse by the counters 110 and 112 from the gate 118 after the inhibiting of the gate 106, a NAND gate 132 is changed from an enabled state to an inhibited state to thereby enable a NOR gate 134 and to thereby provide a low voltage level to the SHIFT/LOAD input terminals of the shift registers 120, 122 and 124. Enabling the NOR gate 134 enables the OR gate 104 and the OR gate 106 of the ONE-SHOT 108 to reset the counters 110 and 112 for counting the next set of 24 clock pulses from the gate 118. Providing a low voltage level to the SHIFT/LOAD input terminals of the shift registers 120, 122 and 124 loads the eight consecutive stages of the shift registers 120, 122 and 124 corresponding to the eight consecutive switches 50 that were switched from a normally closed to an open condition in response to the detection of the original document 26.

Thus, the first 2.32 inches of linear travel of the original document 26 as detected by the switches 50 is ignored by the device 10 since the parallel stages of the shift registers 120, 122 and 124 are not loaded with any information until the gate 132 is inhibited subsequent to the detection of the first 24 clock pulses from the gate 118 by the counters 110 and 112. This built-in delay of the device 10 in accumulating area information is utilized to prevent an original document 26 fed into the copying machine 20 in a skewed condition from loading erroneous width information into the parallel stages of the shift registers 120, 122 and 124 for the leading increment of length of the original document 26.

After the gate 132 is inhibited, the width information from the activated switches 50 is loaded into the corresponding stages of the shift registers 120, 122 and 124 for the second 2.32 inch increment of travel of the original document 26 past the switches 50. Upon the receipt of the first clock pulse of the second set of 24 clock pulses from the gate 118, the information loaded into the serially connected parallel stages of the shift registers 120, 122 and 124 is shifted one stage to the right. Thus, during the second 2.32 inch increment of linear travel of the original document 26, 24 clock pulses from the gate 118 are presented to the counters 110 and 112 and to the shift registers 120, 122 and 124 resulting in eight output pulses from the shift register 124 at the conclusion of the 24th clock pulse of the second set of 24 clock pulses from the gate 118.

Each of the output pulses from the shift register 124 represents a four square inch increment of area of the original document 26. The output pulses from the shift register 124 may be used to advance the indicator counter 126 one step for each of the output pulses. Alternately, and as illustrated in FIG. 6, the output pulses from the shift register 124 are accumulated by a pair of serially connected binary counters 128 and 130. The counters 128 and 130 are used to step the indicator counter 126 one step for every set of 18 output pulses from the shift register 124. Thus, the indicator counter 126 is stepped in ½ square foot increments.

A NOR gate 136 is enabled in response to each output pulse from the shift register 124 to thereby provide a clock pulse for advancing the counter 128. The binary counters 128 and 130 accumulate clock pulses from the NOR gate 136 until all of the switches 50 are returned to their normally closed condition indicating the passage of the trailing edge of the original document 26. When the trailing edge of the original document 26 releases all of the movable members 52 of the switches 50 to return the members 52 to their normal position in the path 54 of the original document 26, all of the outputs of the inverting amplifiers 102 are returned to a high voltage level to inhibit a NOR gate 138. The inhibited NOR gate 138 in turn enables a NOR gate 140 that in turn inhibits the NOR gate 136 to prevent any further clock pulses from being presented to the input of the binary counter 128.

In a specific embodiment, the counters 128 and 130 have two of their output terminals connected to a NAND gate 142 to inhibit the gate 142 after the counters 128 and 130 have accumulated 18 pulses from the gate 136. The inhibited gate 142 enables a NOR gate 144 to in turn enable an OR gate 146 of a ONE-SHOT 148 for driving a pair of transistors 150 connected in a Darlington-pair configuration for stepping the indicator counter 126.

The enabled NOR gate 144 further enables an OR gate 152 of a ONE-SHOT 154 for resetting the counters 128 and 130 to a zero count. Thus, the counters 128 and 130 provide an output pulse for every set of 18 input clock pulses to step the indicator counter 126 one step for each ½ square foot increment of area of the original document 26 as measured by the device 10. Preferably, the indicator counter 126 includes a visual numerical display for enabling an operator of the copying machine 20 to quickly compute the fee for billing purposes for reproducing the original document 26.

Obviously, many modifications and variations of the present invention are possible in light of the above disclosure. For example, the miniature mechanical switches 50 forming the spaced sensors 48 of the sensing device 44 could obviously be replaced by other sensing means without departing from the principles of the present invention. For example, if economic considerations are minimal, a photodetector could be substituted for each of the switches 50. The use of photodetectors would also eliminate the risk of jamming that is present due to physical contact between the original document 26 and the deflectable members 52 of the switches 50.

Further, any suitable number of sensors 48 may be disposed across the path 54. Also, the pulse generator 46 could obviously be replaced with any one of many other suitable sources of clock pulses synchronized to the speed of travel of the original document 26 through the copying machine 20. Thus, it is to be understood that, within the scope of the appended claims, the invention may be practiced otherwise than as specifically described.

What is claimed and desired to be secured by Letters Patent of the United States is:

1. A device for determining the area of a planar object in motion along a path of travel comprising:
    means disposed across said path of travel of said planar object for detecting a first dimension of said planar object, said detecting means including a plurality of sensors evenly spaced across said path of travel, each sensor including means for providing an output signal upon detection of said object,
    a pulse source providing a predetermined number of clock pulses for a predetermined increment of linear travel of said planar object along said path of travel, said pulse source comprising a source of electromagnetic radiation, means for detecting the presence of electromagnetic radiation, and a rotatable opaque circular disk having a plurality of apertures equally spaced about the periphery thereof positioned between the source of electromagnetic radiation and said electromagnetic radiation detecting means, said electromagnetic radiation detecting means including means for generating a single one of said clock pulses in response to each detection of electromagnetic radiation,
    mixing means responsive to said output signal from said first dimension detecting means and said clock pulses for providing at least one output signal corresponding to an increment of an area of said planar object, said mixing means including a shift register having a plurality of serially interconnected stages numerically equal to the number of said plurality of said sensors, each stage being electrically coupled to one of said sensors and including means for storing first and second signals, each of said stages being operable to store said second signal in response to an output signal from the sensor coupled thereto and to store said first signal in the absence of an output signal from the sensor coupled thereto, said shift register being responsive to said clock pulses for serially shifting said first and second signals between said stages, and
    means connected to one of said stages for accumulating the second signals shifted therethrough to provide an indication of the total area of said planar object.

2. A device as defined in claim 1 wherein said mixing means further includes means for inhibiting the storage of said signals by each of said stages until a plurality of said clock pulses numerically equal to said number of said plurality of said sensors have been provided by said source subsequent to the detection of said planar object by at least one of said sensors.

3. A device as defined in claim 1 wherein said accumulating means includes means for receiving and counting said second signals from said mixing means and for providing an output signal in response to the receipt of a predetermined number of said second signals from said mixing means.

4. A device as defined in claim 3 wherein said accumulating means includes an indicator counter for receiving said output signal from said receiving and counting means and for providing a visual indication of the total number of output signals received from said receiving and counting means.

5. A device as defined in claim 1 wherein the number of each of said plurality of said sensors and said plurality of stages is equal to a positive integer N, said device further including counting means responsive to said clock pulses for providing a loading signal in response to each N clock pulses received thereby, said shift register being responsive to said loading signal for simultaneously sampling said output signals and storing said first and second signals in response thereto.

6. A device for reproducing an original document on a sheet of copy paper comprising
    means for feeding said original document through such device along a path of travel,
    means for illuminating said original document to form a latent image of said original document on said sheet,
    means for developing said latent image to form a visual image of said original document on said sheet and
    means for determining the area of said original document, said area determining means comprising
        means disposed across said path of travel of said original document for detecting a first dimension of said original document and for simultaneously providing a plurality of output signals, the number of said output signals being indicative of said first dimension, a pulse source providing a predetermined number of clock pulses for a predetermined increment of linear travel of said original document along said path of travel, said pulse source including means rotatable in synchronism with the movement with said original document along said path of travel, said rotatable means having a plurality of indicia spaced about the periphery thereof, said pulse source further including means responsive to said indicia for generating a single one of said clock pulses in response to each one of said indicia for each rotation of said rotatable means, means for simultaneously sampling and storing said output signals from said detecting means, said sample and storage means having a plurality of stages, each stage being adapted to sample and store one of said simultaneous output signals, said sample and storage means being responsive to said clock pulses for sequentially shifting between stages the output signals stored therein and means electrically coupled to one of said stages for accumulating the output signals shifted therethrough to provide an indication of the total area of said original document.

7. A device as defined in claim 6 wherein said detecting means includes a plurality of sensors evenly spaced across said path of travel.

8. A device as defined in claim 7 wherein said predetermined number of clock pulses numerically equals an integral multiple of the number of said plurality of sensors.

9. A device as defined in claim 8 wherein said predetermined number of clock pulses numerically equals said number of said plurality of sensors.

10. A device as defined in claim 9 wherein said sample and storage means includes a shift register and wherein said plurality of stages are included in the shift register and numerically equal to said number of said plurality of said sensors, each one of said sensors being electrically coupled to one of said stages for simultaneously loading one of said simultaneous output signals into said one stage in response to the detection of said original document by said one sensor.

11. A device as defined in claim 10 wherein said sample and storage means further includes means for inhibiting the loading of said output signals into each of said stages until a plurality of said clock pulses numerically equal to said number of said plurality of said sensors have been provided by said source subsequent to the detection of said original document by at least one of said sensors.

12. A device as defined in claim 7 wherein each of said sensors comprises a miniature mechanical switch having a deflectable finger portion for actuating said switch disposed across said path of travel and engagable by said original document.

13. A device as defined in claim 7 wherein said rotatable means comprises a rotatable opaque circular disk, and said plurality of indicia comprises a plurality of apertures equally spaced about the periphery of said disk, the number of said apertures being equal to an integral multiple of the number of said plurality of sensors.

14. A device as defined in claim 13 wherein said source of clock pulses further includes a source of electromagnetic radiation and said means responsive to said indicia comprises means for detecting the presence of electromagnetic radiation, said disk being positioned between said source of electromagnetic radiation and said electromagnetic radiation detecting means.

15. A device as defined in claim 6 wherein said accumulating means includes means for receiving and counting said signals from said a second output sample and storage means and for providing an output signal in response to the receipt of a predetermined number of said output signals from said mixing means.

16. A device as defined in claim 15 wherein said accumulating means includes an indicator counter for receiving said second output signals from said receiving and counting means and for providing a visual indication of the total number of said second output signals received from said receiving and counting means.

17. A device for determining the area of a planar object in motion along a path of travel comprising means disposed across said path of travel of said planar object for detecting a first dimension of said planar object, said detecting means including a plurality of sensors evenly spaced across said path of travel, the number of said sensors being equal to N, where N is a positive integer greater than 1, each of said sensors including means for providing an output signal upon detection of said object, sample and storage means having N stages, each of said N stages being electrically coupled to a single one of said N sensors, a pulse source providing a predetermined number of clock pulses for a predetermined increment of linear travel of said planar object along said path of travel, said pulse source including means rotatable in synchronism with the travel of said object along said path of travel, said rotatable means having a plurality of indicia spaced about the periphery thereof and means responsive to said indicia for providing a single clock pulse indicative of the proximity of each one of said indicia, counting means responsive to said clock pulses for providing a loading signal upon receipt of N clock pulses, said sample and storage means being responsive to said loading signal to simultaneously sample in the stages thereof said output signals from said sensors and store signals representative of said output signals, said sample and storage means being further responsive to each of said clock pulses for serially shifting the output signal representative signals between adjacent stages thereof and means connected to one of said stages for accumulating the output signal representative signals shifted therethrough to provide an indication of the total area of said planar object.

18. A device as recited in claim 17 wherein said accumulating means includes means for receiving and counting the output signal representative signals shifted through said sample and storage means and for providing a second output signal in response to the receipt of a predetermined number of said output signal representative signals.

19. A device as recited in claim 18 wherein said accumulating means includes an indicator counter for receiving said second output signals and for providing a visual indication of the total number of said second output signals received from said receiving and counting means.

20. A device as recited in claim 19 wherein said rotatable means comprises a rotatable opaque circular disk, said plurality of indicia comprises a plurality of apertures equally spaced about the periphery of said disk, the number of said apertures being equal to an integral multiple of N, said pulse source comprises a source of electromagnetic radiation and said means responsive to the indicia comprises means for detecting the presence of electromagnetic radiation, said disk being positioned between said source of electromagnetic radiation and said electromagnetic radiation detecting means.

21. A device as defined in claim 17 wherein said predetermined number of clock pulses numerically equals an integral multiple of the number of said plurality of sensors.

22. A device as defined in claim 21 wherein said predetermined number of clock pulses numerically equals said number of said plurality of sensors.

23. A device as defined in claim 17 wherein each of said sensors comprises a miniature mechanical switch having a deflectable finger portion for actuating said switch disposed across said path of travel and engagable by said planar object.

24. A device for determining the area of a planar object in motion along a path of travel comprising
means disposed across said path of travel of said planar object for detecting a first dimension of said planar object, said detecting means including a plurality of sensors spaced across said path of travel, each sensor including means for providing an output signal upon detection of said object,
a pulse source providing a predetermined number of clock pulses for a predetermined increment of linear travel of said planar object along said path of travel,
mixing means responsive to said output signal from said first dimension detecting means and said clock pulses for providing at least one second signal corresponding to an increment of area of said planar object, said mixing means including a plurality of stages numerically equal to at least the number of said plurality of said sensors, each one of said sensors being electrically coupled to one of said stages for loading information into said one stage in response to the detection of said planar object by said one sensor,
means connected to one of said stages for accumulating the second signals to provide an indication of the total area of said planar object, and
means for inhibiting the loading of said information into each of said stages until a plurality of clock pulses numerically equal to said number of said plurality of said sensors have been provided by said source subsequent to the detection of said planar object by at least one of said sensors.

25. A device as recited in claim 24 wherein said inhibiting means includes means responsive to said output signal from one of said sensors upon detection of said object for counting said clock pulses.

26. A device as recited in claim 25 wherein said mixing means includes a shift register having a plurality of serially interconnected stages.

27. A device for reproducing an original document on a sheet of copy paper comprising
means for feeding said original document through said device along a path of travel,
means for illuminating said original document to form a latent image of said original document on said sheet,
means for developing said latent image to form a visual image of said original document on said sheet, and
means for determining the area of said original document, said area determining means comprising
means disposed across said path of travel of said original document for detecting a first dimension of said original document and for simultaneously providing a plurality of output signals, the number of said output signals being indicative of said first dimension, and a pulse source providing a predetermined number of clock pulses for a predetermined increment of linear travel of said original document along said path of travel,
means for sampling and accumulating said output signals from said detecting means, said sampling and accumulating means being responsive to said clock pulses and said accumulated output signals for providing an indication of the total area of said original document, and
means for inhibiting the generation of said area indicative signal until a plurality of clock pulses numerically equal to said number of said plurality of sensors have been provided by said source subsequent to the detection of said original document by at least one of said sensors.

* * * * *

UNITED STATES PATENT OFFICE
CERTIFICATE OF CORRECTION

Patent No. 3,865,486           Dated February 11, 1975

Inventor(s) William B. Miles and John S. Copeland

It is certified that error appears in the above-identified patent and that said Letters Patent are hereby corrected as shown below:

Abstract, lines 15-16, delete "is determined by loading the width of the original document". Col. 5, line 53, delete "," after "7"; line 56, delete "," after "7". Col. 6, line 33, change "ssitches" to -- switches --. Col. 11, line 41, after "and" insert -- serially-connected and --. Col. 12, line 8, after "said" (first occurrence) insert -- output --; line 8, after "said" (second occurrence) delete "a second output"; line 9, delete "an" and insert thereof -- a second --. Col. 14, lines 11-12, delete "upon detection of said object"; line 12, after "pulses" insert -- upon receipt of one of said output signals --.

Signed and Sealed this twenty-second Day of July 1975

[SEAL]

Attest:

RUTH C. MASON
*Attesting Officer*

C. MARSHALL DANN
*Commissioner of Patents and Trademarks*